United States Patent
Yamamoto

[19]

[11] Patent Number: 5,805,350
[45] Date of Patent: Sep. 8, 1998

[54] WIDE ZOOM LENS

[75] Inventor: Chikara Yamamoto, Omiya, Japan

[73] Assignee: Fuji Photo Optical Co. Ltd., Omiya, Japan

[21] Appl. No.: 794,243

[22] Filed: Jan. 31, 1997

[30] Foreign Application Priority Data

Mar. 4, 1996 [JP] Japan .................................... 8-075158

[51] Int. Cl.$^6$ ................................................. G02B 15/14
[52] U.S. Cl. ........................ 359/686; 359/683; 359/680; 359/676
[58] Field of Search .................................. 359/686, 683, 359/682, 681, 680, 676, 781

[56] References Cited

U.S. PATENT DOCUMENTS 4,653,873  3/1987  Kawamura ............................... 359/686
4,759,617  7/1988  Tokumaru et al. ....................... 359/686

FOREIGN PATENT DOCUMENTS 5-297276  of 0000  Japan .

*Primary Examiner*—Georgia Y. Epps
*Assistant Examiner*—Jordan M. Schwartz
*Attorney, Agent, or Firm*—Ronald R. Snider

[57] ABSTRACT

In a zoom lens of a four-group configuration comprising, successively from the enlargement side, negative, positive, negative, and positive lens groups, the focal lengths of the respective groups are set within predetermined ranges, whereby the lens system can have a compact configuration for its imaging size, the back focus can have an appropriate extent, various kinds of aberration can be made favorable, and the bundle of rays on the reduction side can be made similar to those of a telecentric type. Disposed successively from the enlargement side are a first lens group which is fixed during zooming and has a negative refractive power for focusing, a second lens group having a positive refractive power and a third lens group having a negative refractive power which are moved with a relationship therebetween so as to vary power and correct movement of imaging surface caused by thus varied power, and a fourth lens which is fixed during zooming and has a positive refractive power, while the following conditional expressions:

$-2.0 < F_1/F < -0.9, 0.65 < F_2/F < 1.4, 0.9 < F_4/F < 1.7$ are satisfied.

7 Claims, 20 Drawing Sheets

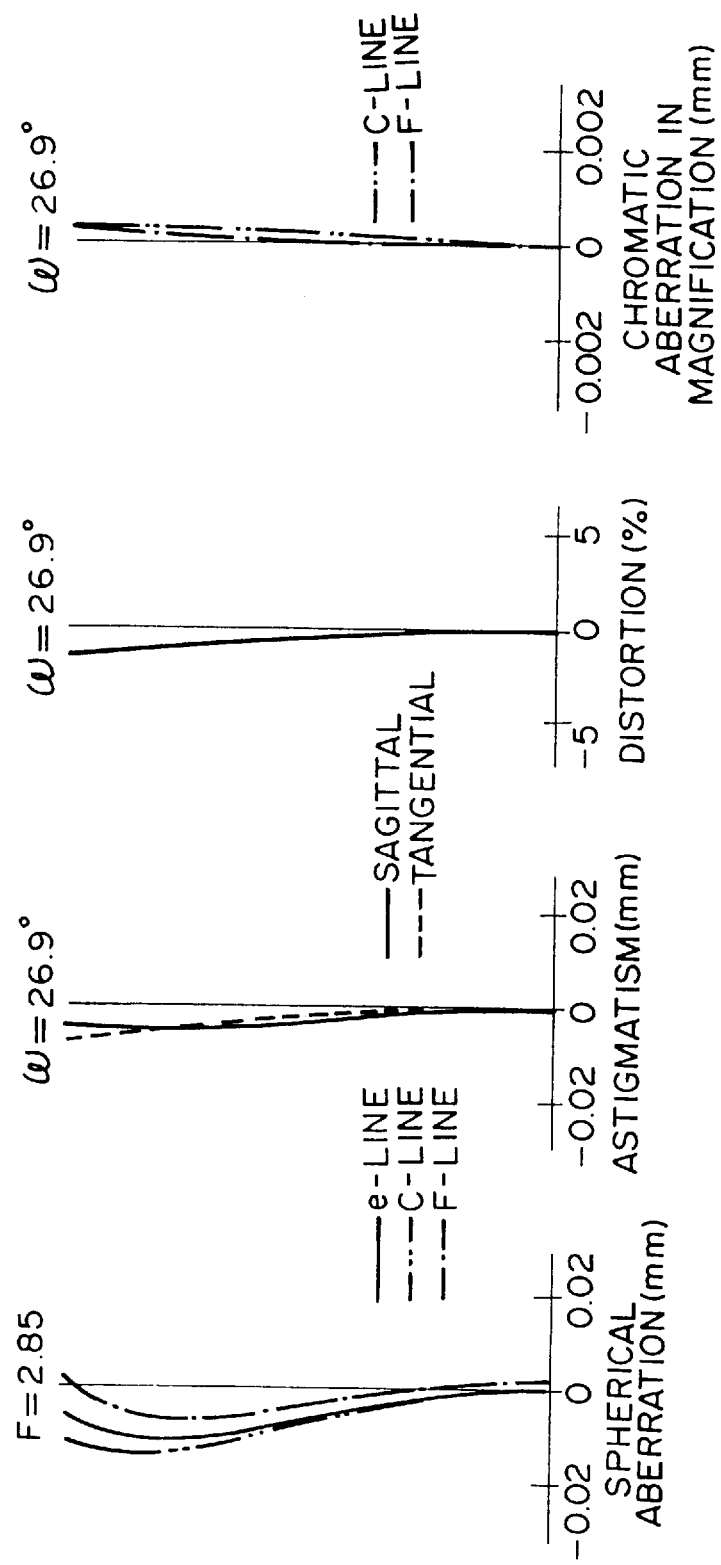

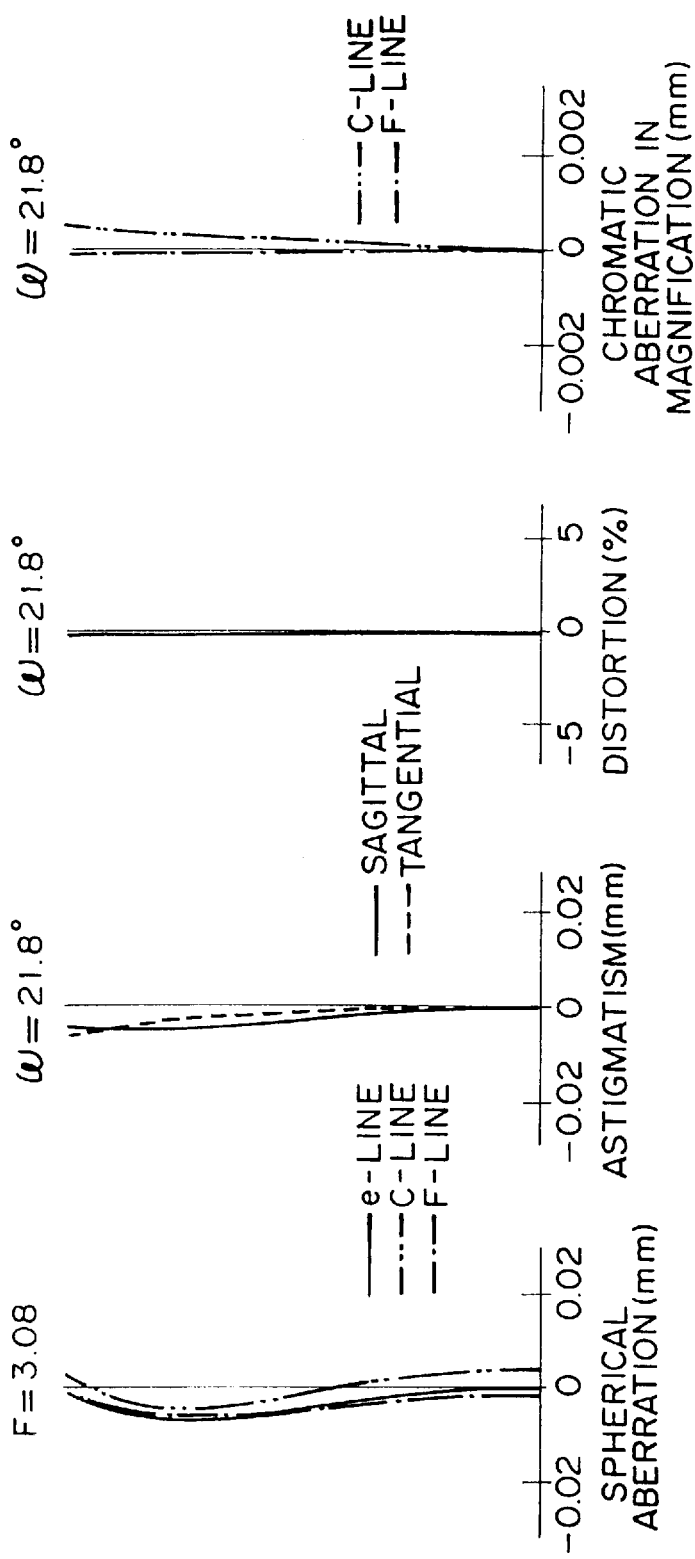

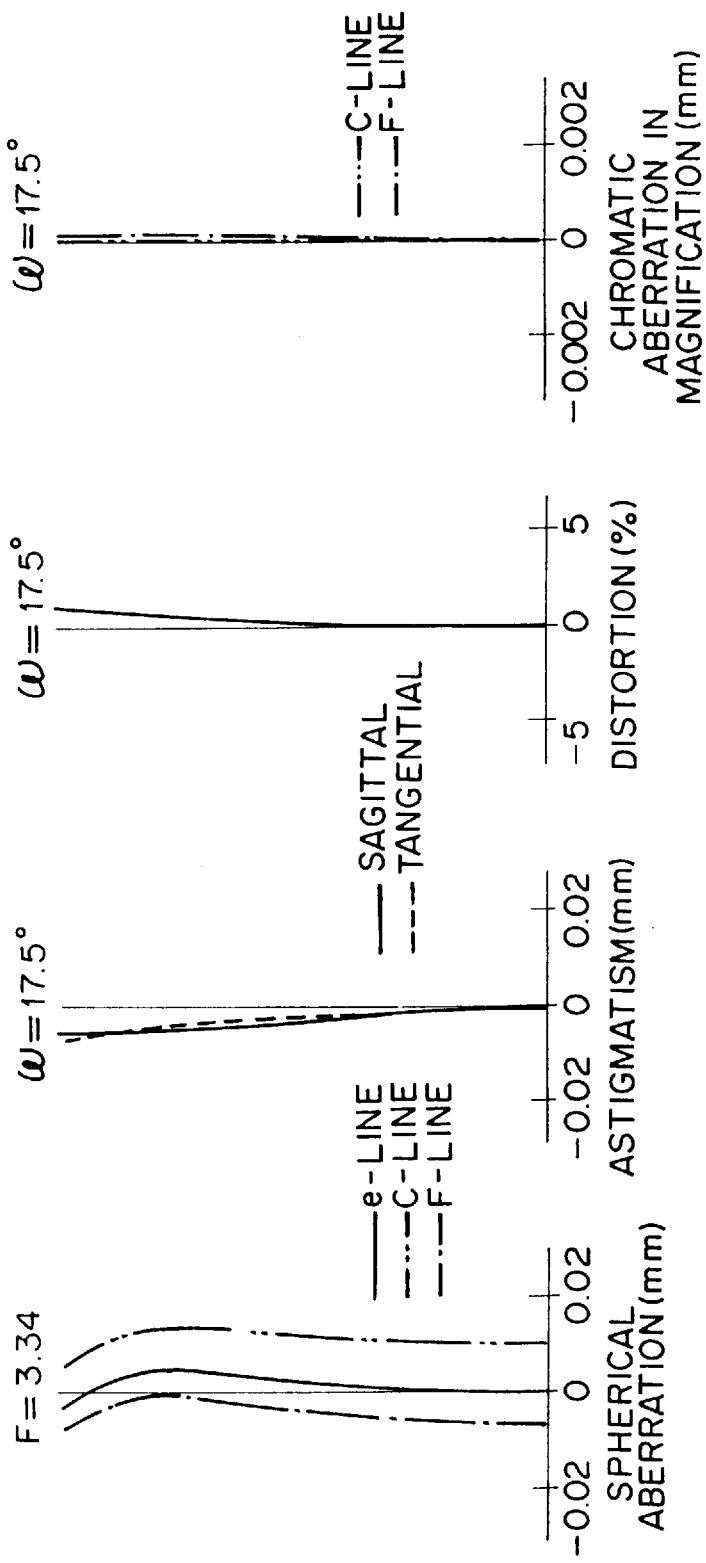

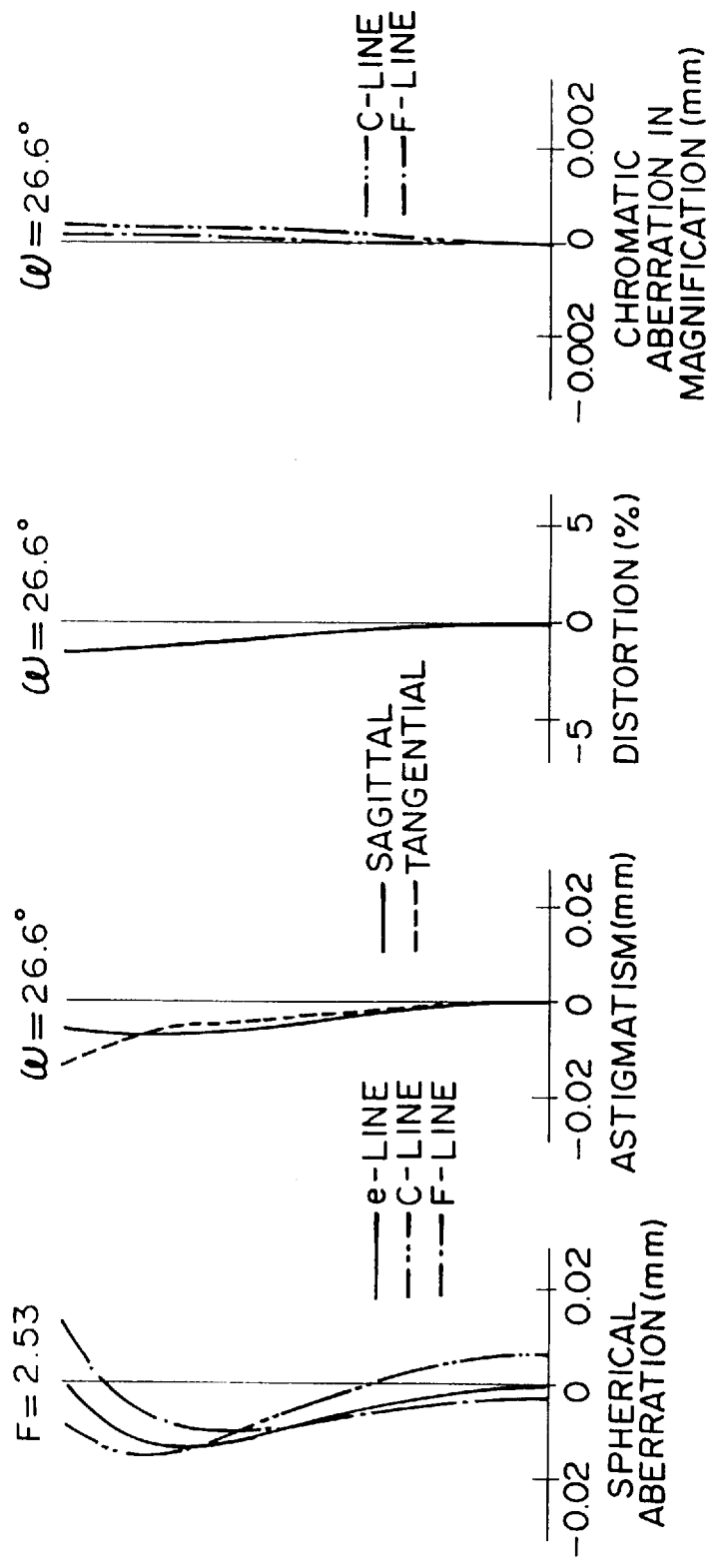

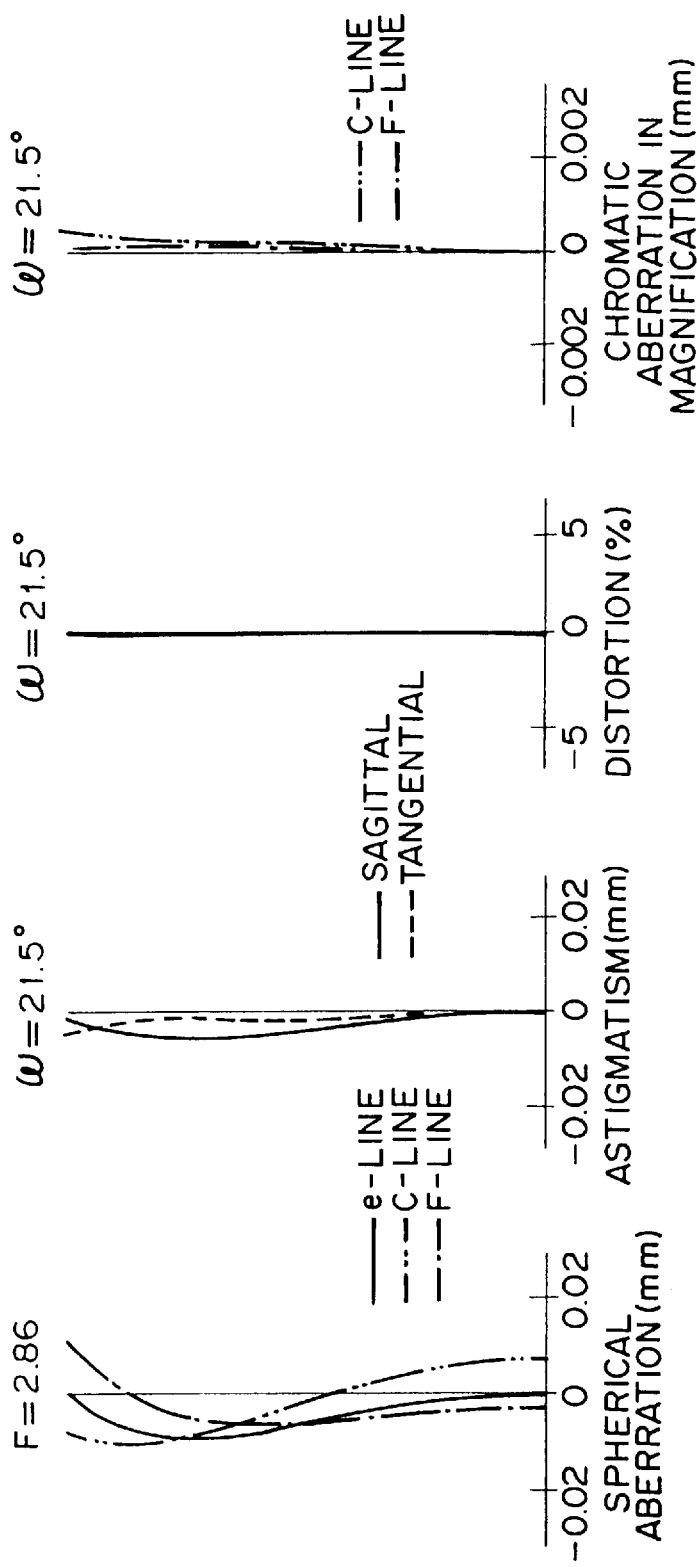

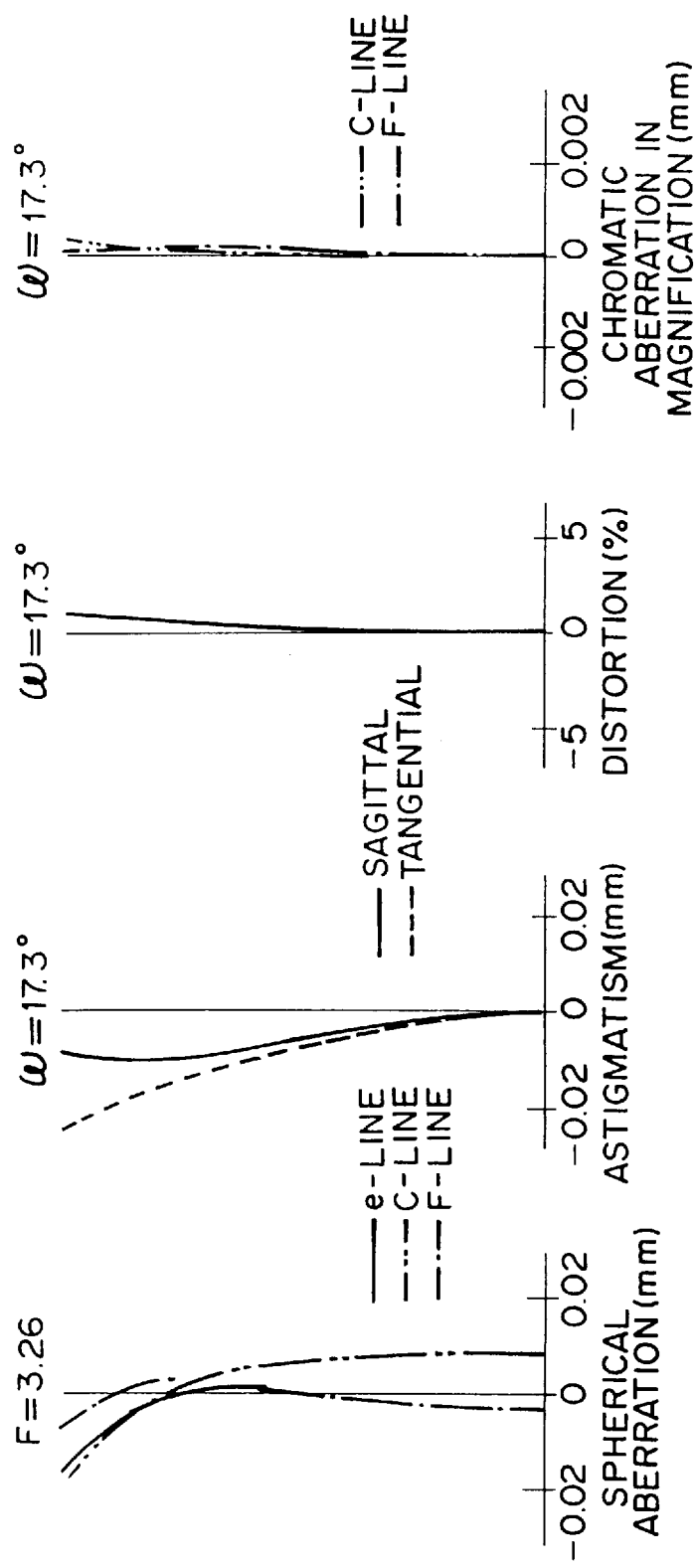

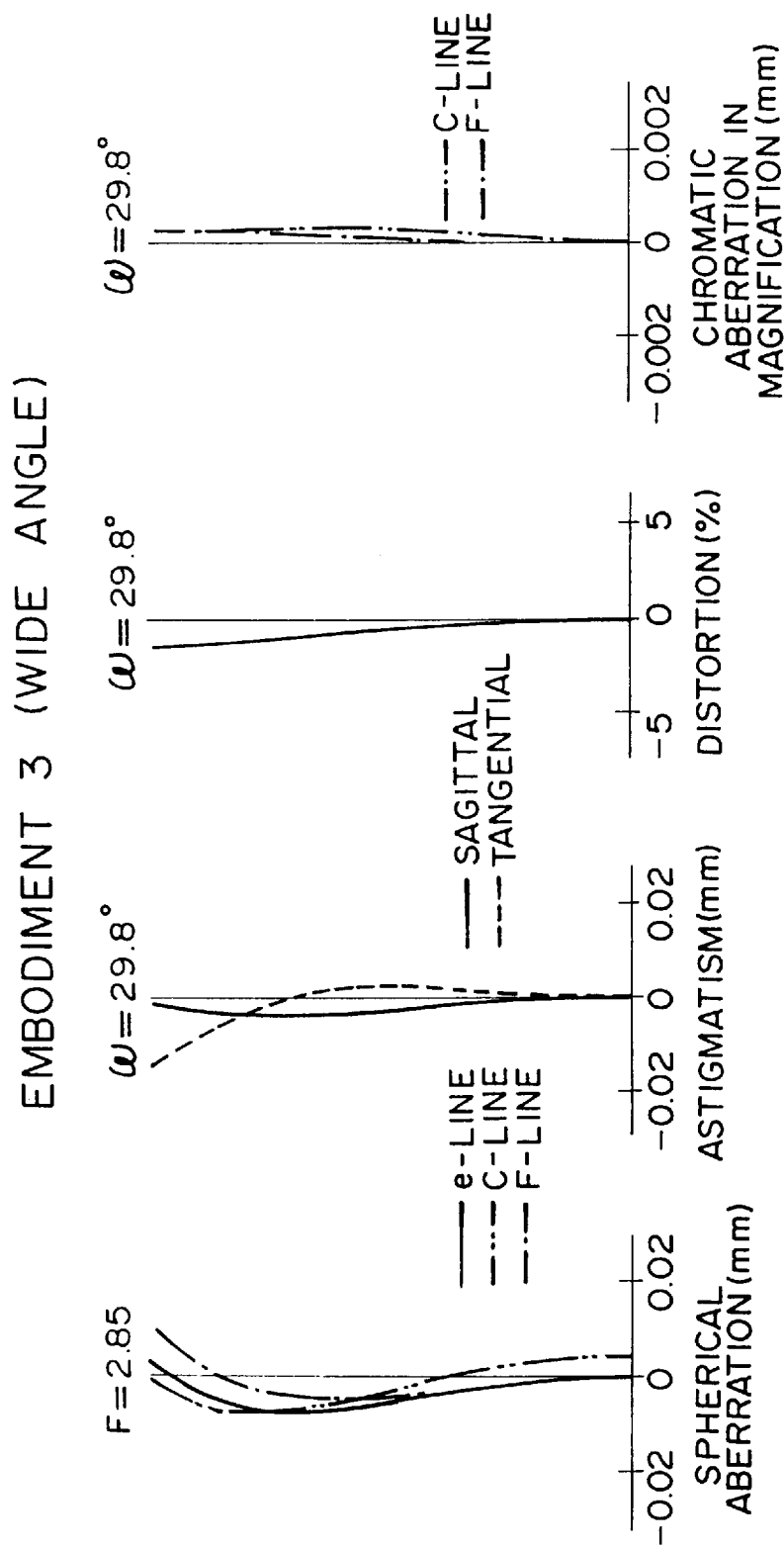

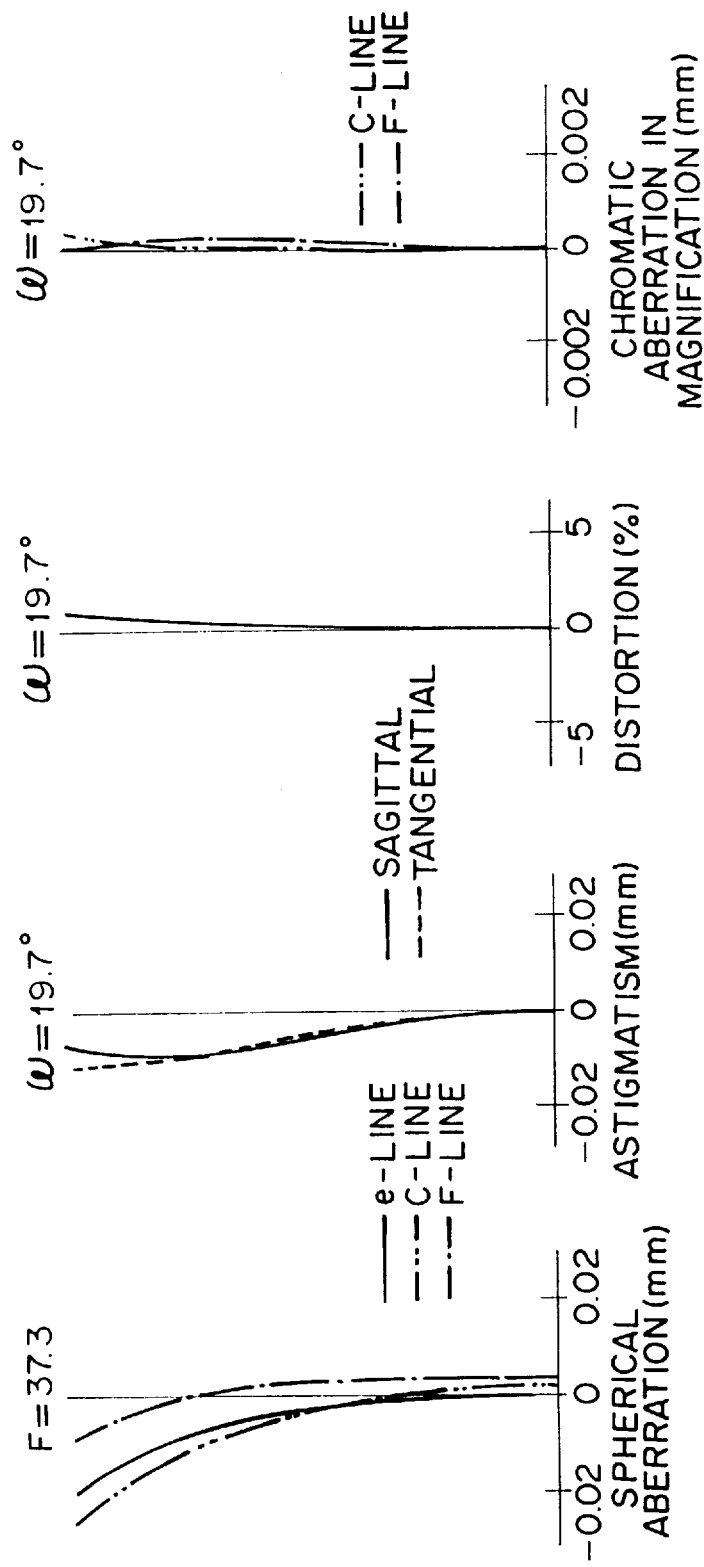

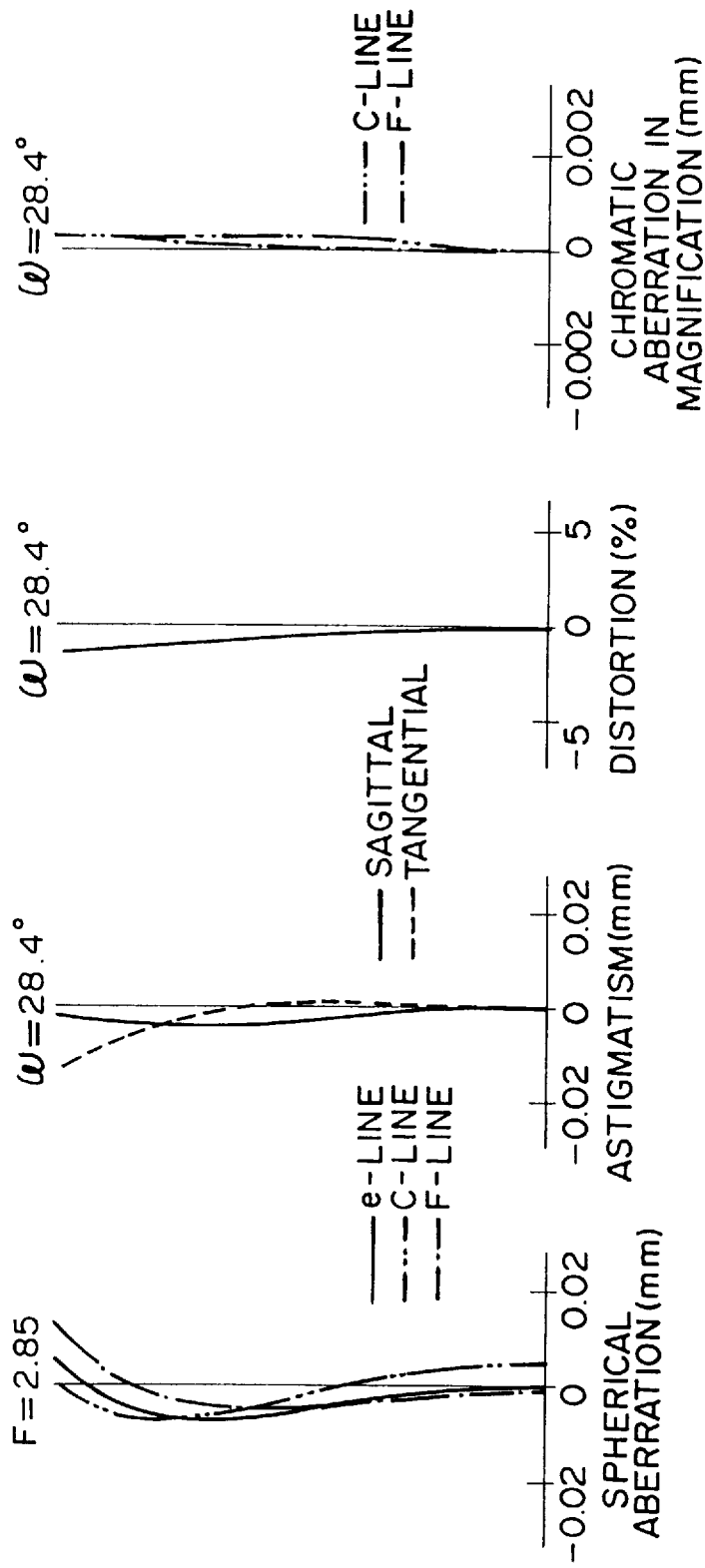

EMBODIMENT 4 (MEDIUM)

EMBODIMENT 4 (TELEPHOTO)

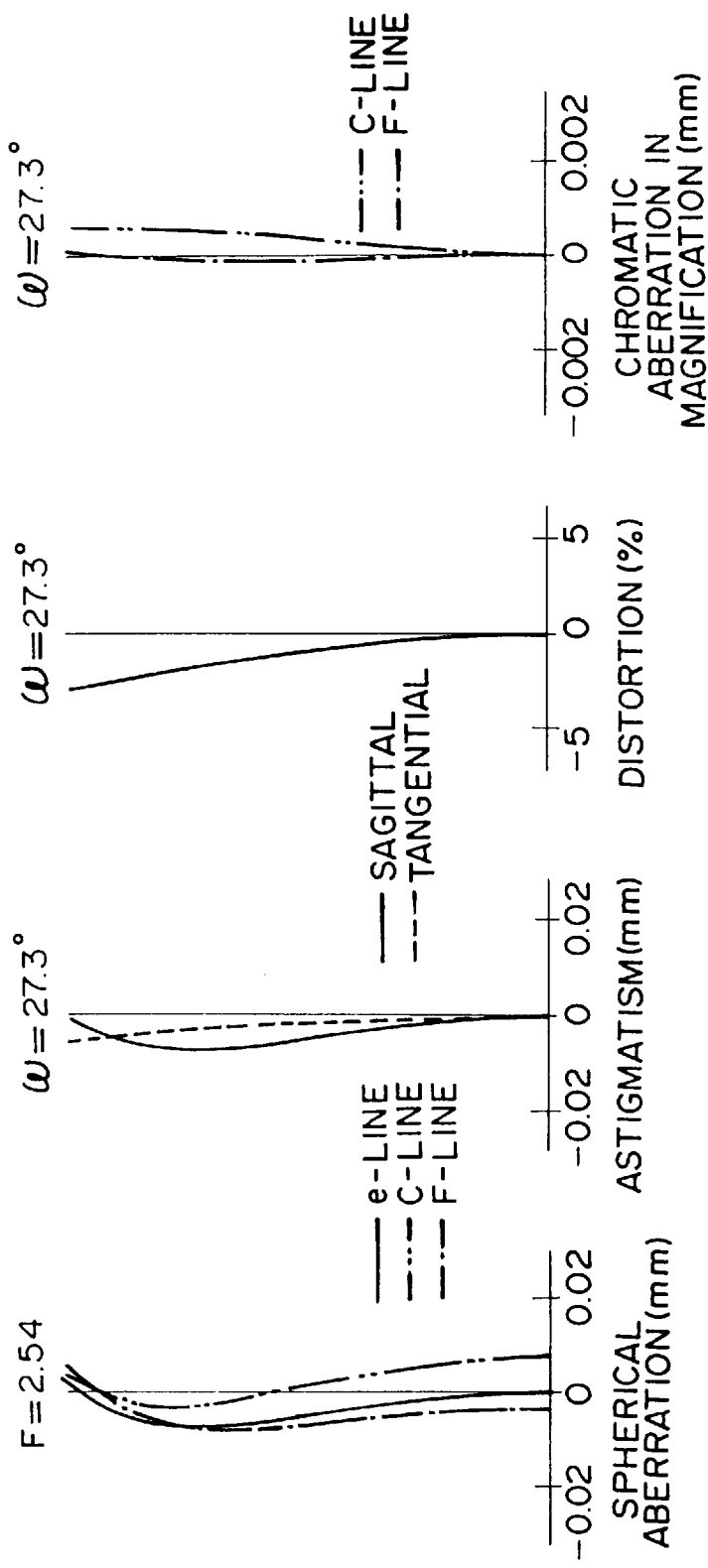

EMBODIMENT 5 (MEDIUM)

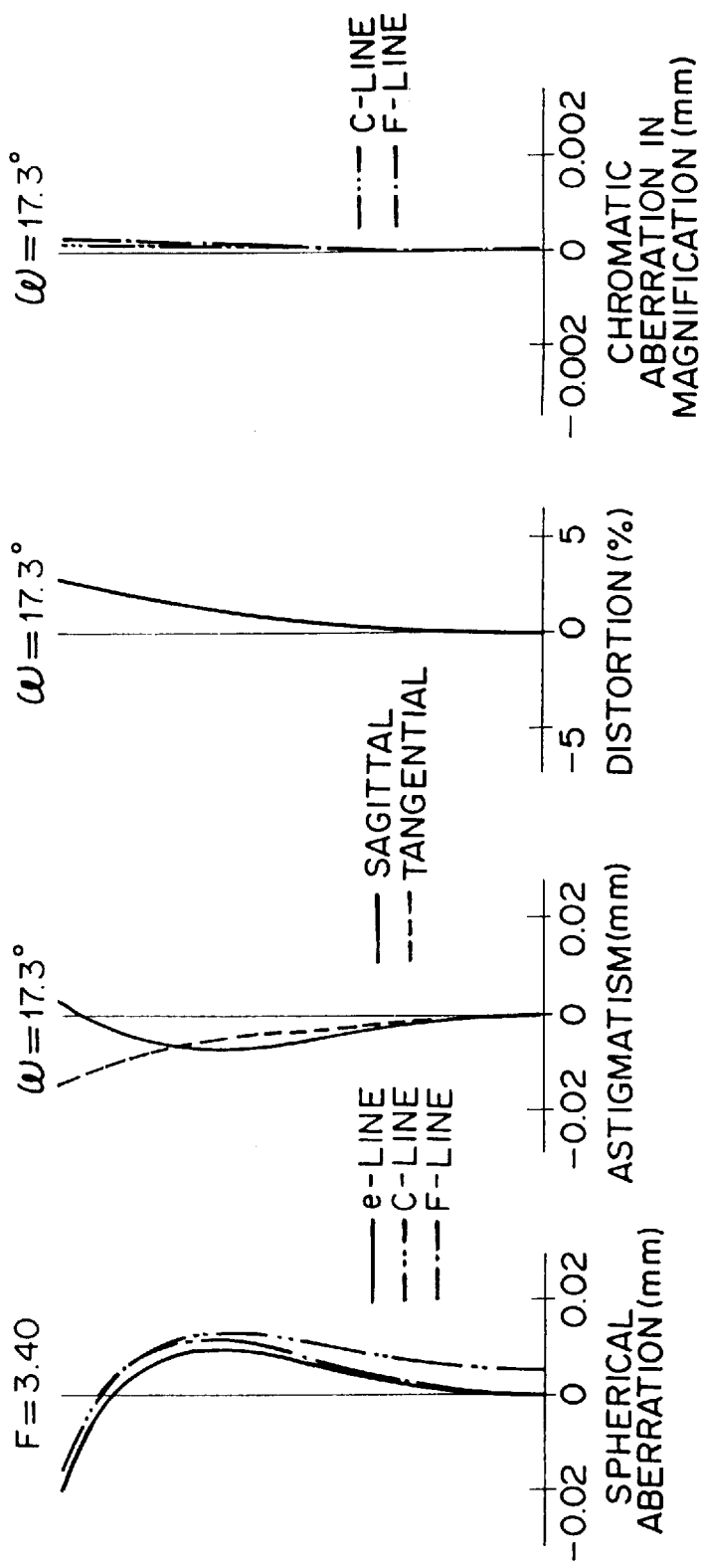

WIDE ZOOM LENS

RELATED APPLICATIONS

This application claims the priority of Japanese Patent Application No. 8-75158 filed on Mar. 4, 1996, which is incorporated herein by reference.

BACKGROUND OF THE INVENTION

1. Field of the Invention

The present invention relates to a wide zoom lens and, more specifically, to an imaging zoom lens in a camera using an imaging device such as CCD or image pickup tube or a silver halide film or the like, as well as a projection zoom lens for a projection type television.

2. Description of the Prior Art

There has conventionally been known a zoom lens comprising a negative first lens group which is fixed during varying power and has a focusing function, a positive second lens group which has a power varying function, a negative third lens group which corrects the movement of imaging plane caused by change in power, and a positive fourth lens group which is fixed during varying power (e.g., Japanese Unexamined Patent Publication No. 5-297276).

Such a kind of zoom lens has been designed mainly in order to form an image onto a small-size imaging device such as CCD.

While projection type televisions using liquid crystals have been widely noticed in recent years, when the above-mentioned zoom lens is adopted, as it is, as a projection lens used in such a projection type television, the size of the lens system itself increases as its imaging size is greater. In the current circumstances where the request for smaller-size apparatus is increasing, larger lens systems are unfavorable.

Also, in general, when the above-mentioned zoom lens is used as a projectionlens, there is a possibility that distortion may be corrected insufficiently.

When the zoom lens is adopted as a projection lens of the above-mentioned projection type television using liquid crystals, in particular, its relationship with respect to the illumination system must also be taken into consideration. In order to prevent color fluctuation and light amount loss from occurring, desirably formed is a telecentric type lens system in which the principal ray becomes parallel to the optical axis on the reduction side of the projection lens. Such a lens system, however, is not always realized in the above-mentioned prior art.

Further, in the above-mentioned prior art, when a color separating optical system is to be inserted at a predetermined position on the optical axis, a back focus which provides a space sufficient for allowing such insertion is not always provided.

SUMMARY OF THE INVENTION

In view of such a circumstance, the object of the present invention is to provide a wide zoom lens having a compact configuration for its imaging size and an appropriate extent of back focus, in which the bundle of rays within the tangential plane on the reduction side become substantially symmetrical with respect to the optical axis and various kinds of aberration are favorably corrected.

The zoom lens in accordance with the present invention comprises, successively from the enlargement side, a first lens group which is fixed during zooming and has a negative refractive power for focusing; a second lens group having a positive refractive power and a third lens group having a negative refractive power which are moved with a relationship therebetween so as to vary power and correct movement of imaging surface caused by thus varied power; and a fourth lens which is fixed during zooming and has a positive refractive power;

wherein the following conditional expressions (1), (2), and (3) are satisfied:

$$-2.0 < F_1/F < -0.9 \quad (1)$$

$$0.65 < F_2/F < 1.4 \quad (2)$$

$$0.9 < F_4/F < 1.7 \quad (3)$$

wherein

F is the focal length of the whole lens system at the wide angle end;
$F_1$ is the focal length of the first lens group;
$F_2$ is the focal length of the second lens group; and
$F_4$ is the focal length of the fourth lens group.

Also, desirably, the second lens group is constituted by at least one negative lens and two positive lenses and satisfies the following conditional expression (4) or (8):

$$0.4 < D_2/F_2 < 1.1 \quad (4)$$

wherein $D_2$ is the lens length of the second lens group;

$$0.08 < DD_2/F_2 < 0.75 \quad (8)$$

wherein $DD_2$ is the longest distance between the positive lenses in the second lens group.

Further, desirably, the imaging magnification at the wide angle end of the second lens group and the imaging magnification of the fourth lens group are configured so as to satisfy the following conditional expressions (5) and (6):

$$-1.05 < \beta 2W < -0.45 \quad (5)$$

$$-0.15 < \beta 4 < 0.35 \quad (6)$$

wherein

β 2W is the imaging magnification at the wide angle end of the second lens group; and
β 4 is the imaging magnification of the fourth lens group.

Also, desirably, the Abbe number of the lens positioned closest to the enlargement side end in the first lens group is constituted so as to satisfy the following conditional expression (7):

$$v1 < 55 \quad (7)$$

wherein v 1 is the Abbe number of the lens positioned closest to the enlargement side end in the first lens group.

BRIEF DESCRIPTION OF THE DRAWINGS

FIGS. 6A to 6D is an aberration chart of the lens in accordance with Embodiment 1 (at its wide angle end);

FIGS. 7A to 7D is an aberration chart of the lens in accordance with Embodiment 1 (at its medium range);

FIGS. 8A to 8D is an aberration chart of the lens in accordance with Embodiment 1 (at its telephoto end);

FIGS. 9A to 9D is an aberration chart of the lens in accordance with Embodiment 2 (at its wide angle end);

FIGS. 10A to 10D is an aberration chart of the lens in accordance with Embodiment 2 (at its medium range);

FIGS. 11A to 11D is an aberration chart of the lens in accordance with Embodiment 2 (at its telephoto end);

FIGS. 12A to 12D is an aberration chart of the lens in accordance with Embodiment 3 (at its wide angle end);

FIGS. 14A to 14D is an aberration chart of the lens in accordance with Embodiment 3 (at its telephoto end);

FIGS. 15A to 15D is an aberration chart of the lens in accordance with Embodiment 4 (at its wide angle end);

FIGS. 18A to 18D is an aberration chart of the lens in accordance with Embodiment 5 (at its angle end);

FIGS. 20A–20D is an aberration chart of the lens in accordance with Embodiment 5 (at its telephoto end).

DETAILED DESCRIPTION OF THE PREFERRED EMBODIMENTS

In the following, embodiments of the present invention will be explained with reference to drawings. While five embodiments will be specifically explained in the following, elements identical to each other will be referred to with marks identical to each other in the explanation of the drawings respectively corresponding to the embodiments, without their overlapping descriptions repeated.

(Embodiment 1)

Figure 1:
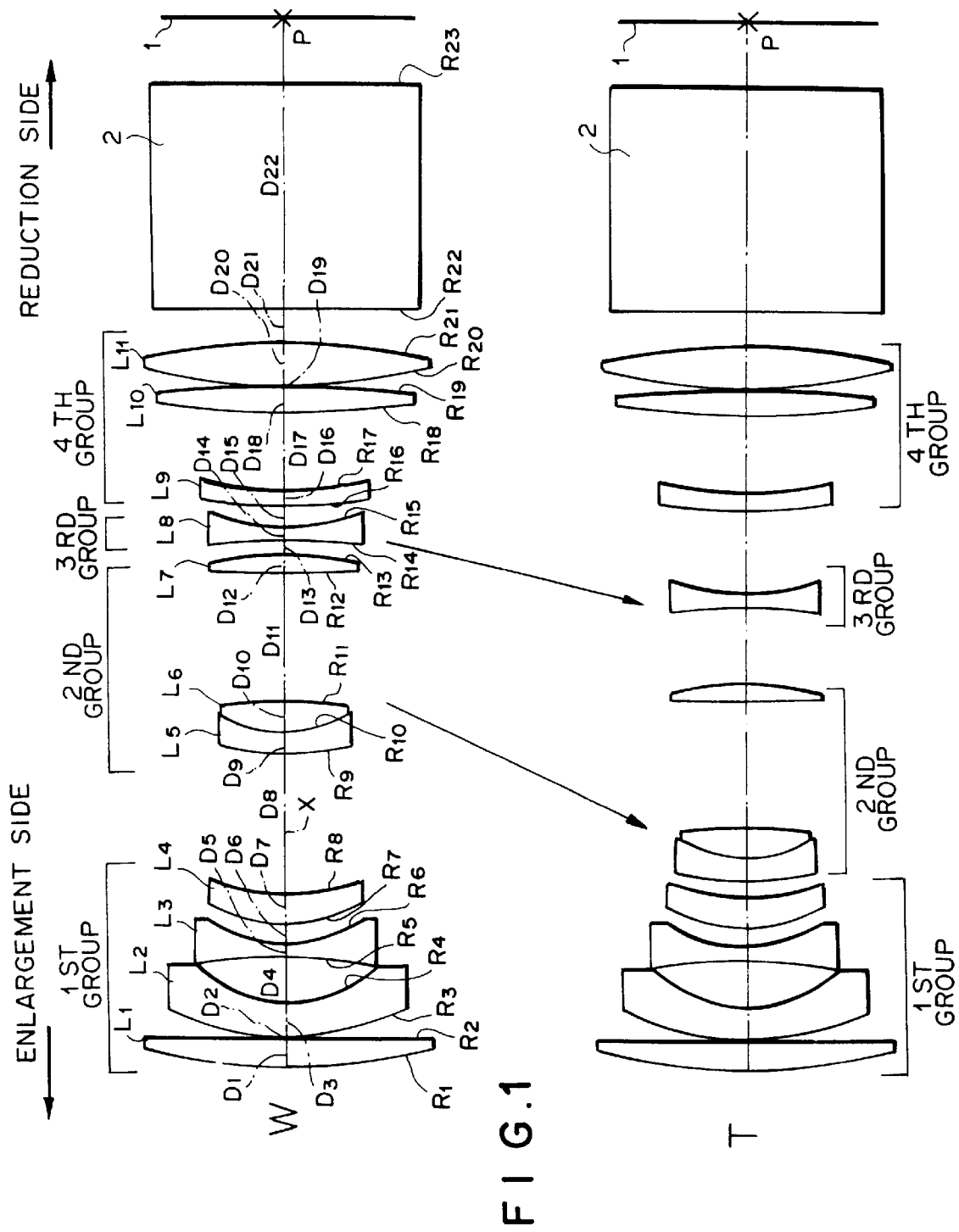
FIG. 1 is a schematic view showing a basic lens configuration in accordance with Embodiment 1 of the present invention.

As shown in FIG. 1, the wide zoom lens of this embodiment comprises, successively from the enlargement side, a first lens group comprising, successively from the enlargement side, a positive first lens $L_1$, a negative second lens $L_2$, a negative third lens $L_3$, and a positive fourth lens $L_4$;

a second lens group comprising, successively from the enlargement side, a negative fifth lens $L_5$, a positive sixth lens $L_6$, and a positive seventh lens $L_7$;

a third lens group comprising a negative eighth lens $L_8$, and a fourth lens group comprising, successively from the enlargement side, a negative ninth lens $L_9$, a positive tenth lens $L_{10}$, and a positive eleventh lens $L_{11}$. This wide zoom lens is configured so as to satisfy the following conditional expressions:

$$-2.0 < F_1/F < -0.9 \quad (1)$$

$$0.65 < F_2/F < 1.4 \quad (2)$$

$$0.9 < F_4/F < 1.7 \quad (3)$$

wherein
F is the focal length of the whole lens system at the wide angle end;
$F_1$ is the focal length of the first lens group;
$F_2$ is the focal length of the second lens group; and
$F_4$ is the focal length of the fourth lens group.

Also, the second lens group is constituted by one negative lens and two positive lenses and satisfies the following conditional expression (4):

$$0.4 < D_2/F_2 < 1.1 \quad (5)$$

wherein $D_2$ is the lens length of the second lens group.

Further, the imaging magnification at the wide angle end of the second lens group and the imaging magnification of the fourth lens group are configured so as to satisfy the following conditional expressions (5) and (6):

$$-1.05 < \beta 2W < -0.45 \quad (5)$$

$$-0.15 < \beta < 0.35 \quad (6)$$

wherein
$\beta 2W$ is the imaging magnification at the wide angle end of the second lens group; and
$\beta 4$ is the imaging magnification of the fourth lens group.

Also, the Abbe number of the lens positioned closest to the enlargement side end in the first lens group satisfies the following conditional expression (7):

$$v1 < 55 \quad (7)$$

wherein $v 1$ is the Abbe number of the lens positioned closest to the enlargement side end in the first lens group.

Also, the second lens group satisfies the following conditional expression (8):

$$0.08 < DD_2/F_2 < 0.75 \quad (8)$$

wherein $DD_2$ is the longest distance between the positive lenses in the second lens group.

Here, a luminous flux incident from the enlargement side along an optical axis X forms an image at an imaging position P on an imaging plane 1. Also, arranged between the fourth lens group and the imaging plane 1 are a filter for cutting infrared rays or low-pass filter 2 and a color separating optical system.

Here, each of the first lens $L_1$ and fourth lens $L_4$ is a positive meniscus lens having a convex surface directed onto the enlargement side; each of the second lens $L_2$, fifth $L_5$, and ninth lens $L_9$ is a negative meniscus lens having a convex surface directed onto the enlargement side; each of the third lens $L_3$ and eighth lens $L_8$ is a biconcave lens having a surface with a stronger curvature directed onto the reduction side; each of the sixth lens $L_6$, tenth lens $L_{10}$, and eleventh lens $L_{11}$ is a biconvex lens having a surface with a stronger curvature directed onto the enlargement side; and the seventh lens $L_7$ is a biconvex lens having a surface with a stronger curvature directed onto the reduction side. The fifth lens $L_5$ and sixth lens $L_6$ are cemented together.

In the following, the above-mentioned conditional expressions (1) to (8) will be explained.

When $F_1/F$ is below the lower limit in the above-mentioned conditional expression (1), the negative power of the first lens group reduces, such that the amount of movement of the first lens group upon focusing increases, thereby making a greater amount of fluctuation in aberration. When $F_1/F$ exceeds the upper limit thereof, by contrast, the negative power of the first lens group increases, whereby the axial ray is kicked up by the first lens group so much that it becomes difficult to correct aberration (distortion and spherical aberration in particular). Accordingly, in this embodiment, the value of $F_1/F$ is set to −1.34 as shown in Table 6 so as to satisfy conditional expression (1), thereby favorably correcting aberration and restraining the amount of movement of the first lens group from increasing.

When $F_2/F$ is below the lower limit of the above-mentioned conditional expression (2), the positive power of the second lens group increases so much that it becomes difficult to correct aberration. Beyond the upper limit, by contrast, the positive power of the second lens group reduces, whereby the amount of movement of the second lens group upon varying power increases, making the size of the lens system greater. Accordingly, in this embodiment, the value of $F_2/F$ is set to 0.87 as shown in Table 6 so as to satisfy conditional expression (2), thereby favorably correcting aberration and restraining the amount of movement of the second lens group from increasing.

When $F_4/F$ exceeds the upper limit of conditional expression (3), the positive power of the fourth lens group reduces, whereby the back focus becomes so long that the size including the lens back becomes large. Also, the axial ray height of the fourth lens group becomes so low that it is difficult to correct aberration. Below the lower limit of the above-mentioned conditional expression (3), by contrast, the positive power of the fourth lens group is stronger, whereby back focus becomes too short, and it is difficult for the reduction side to become a telecentric type. Accordingly, in this embodiment, the value of $F_4/F$ is set to 1.33 as shown in Table 6 so as to satisfy conditional expression (3), thereby favorably correcting aberration and attaining an appropriate extent of back focus length, while making the bundle of rays on the reduction side of the lens system into that of a telecentric type.

When $D_2/F_2$ or $DD_2/F_2$ is below the lower limit of the above-mentioned conditional expression (4) or (8), the lens length of the second lens group becomes so short that the balance of various kinds of aberration (aberration balance upon zooming in particular) deteriorates. Beyond the upper limit, by contrast, the lens length of the second lens group is longer, thereby increasing the size of the lens system. Accordingly, in this embodiment, the values of $D_2/F_2$ and $DD_2/F_2$ are respectively set to 0.91 and 0.59 as shown in Table 6, thereby making the whole length of the second lens group relatively large so as to satisfy conditional expressions (4) and (8). Thus, while aberration is favorably corrected, the lens size is restrained from increasing.

When $\beta$ 2W is beyond the upper limit or below the lower limit of conditional expression (5), aberration balance upon zooming deteriorates, or the amount of movement of the second lens group and third lens group required for zooming increases so as to make the size of the lens system greater. Accordingly, in this embodiment, the value of the imaging magnification $\beta$ 2W of the second lens group at this wide end is set to −0.58 as shown in Table 6 so as to satisfy conditional expression (5), thereby making the aberration balance favorable and restraining the size of the lens system from increasing.

When $\beta$ 4 is below the lower limit of the above-mentioned conditional expression (6) so as to reduce the imaging magnification of the fourth lens group, the axial ray is greatly bent by the fourth lens group, whereby the number of lens sheets has to be increased. When the imaging magnification of the fourth lens group is small, by contrast, the power of the fourth lens group becomes stronger, whereby it is difficult for the rays outside of the optical axis on the reduction side to become symmetrical with respect to the optical axis in the tangential plane. Beyond the upper limit, by contrast, the imaging magnification of the fourth lens group is so high that back focus becomes longer, whereby the power of the fourth lens group becomes so weak that it is difficult to correct aberration. Accordingly, in this embodiment, the value of the imaging magnification $\beta$ 4 of the fourth lens group is set to 0.24 as shown in Table 6 so as to satisfy conditional expression (6), thereby favorably correcting aberration and attaining a telecentric type bundle of rays, while restraining the number of lens sheets from increasing.

In general, the lens positioned closest to the enlargement side end of a zoom lens often comes into contact with the external environment, and thus is preferably made of a glass material excellent in acid resistance and water resistance. When $\nu$ 1 exceeds the upper limit of conditional expression (7), however, the acid resistance and water resistance deteriorate as the refractive index is greater. Accordingly, in this embodiment, the value of $\nu$ 1 is set to 50.9 as shown in Table 6 so as to satisfy conditional expression (7), thereby yielding favorable acid resistance and water resistance in the glass material.

Table 1 (follows) shows radius of curvature R (mm) of each lens surface, center thickness of each lens and air gap between neighboring lenses D (mm), and refractive index N of each lens at d-line in this embodiment.

In Table 1, as well as in Tables 2 to 5 which will be explained later, the reference numbers corresponding to each of marks R, D, and N successively increase from the object side.

Also, the F number and field angle 2 $\omega$ of the wide zoom lens in this embodiment are 2.85 (wide angle end) to 3.08 (medium) to 3.34 (telephoto end) and 53.8° (wide angle end) to 43.6° (medium) to 35.0° (telephoto end), respectively.

FIGS. 6, 7, and 8 are aberration charts showing various kinds of aberration (spherical aberration, astigmatism, distortion, and chromatic aberration in magnification) of the zoom lens of this embodiment at the wide angle end, medium range, and telephoto end, respectively. Here, for each astigmatism chart, the respective aberrations with respect to the sagittal (S) image surface and the tangential (T) image surface are shown. (These also apply to FIGS. 9 to 20.)

As can be seen from FIGS. 6 to 8 and Table 6 (follows), in accordance with the wide zoom lens of this embodiment, aberration can be favorably corrected throughout the zoom area, a compact configuration for the imaging size can be attained, an appropriate extent of back focus can be obtained, and the bundle of rays within the tangential plane on the reduction side can be made substantially symmetrical with respect to the optical axis.

(Embodiment 2)

Figure 2:
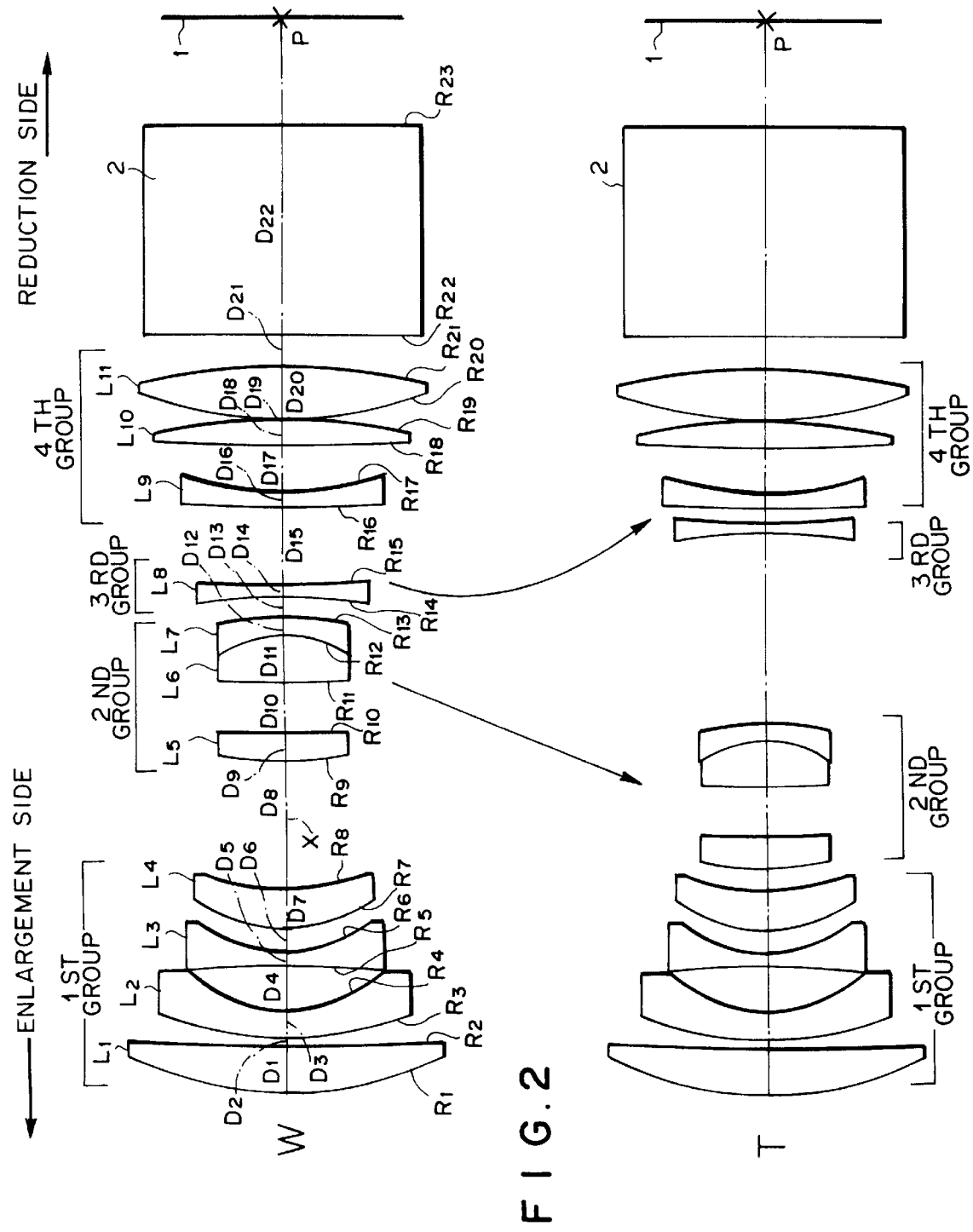
FIG. 2 is a schematic view showing a basic lens configuration in accordance with Embodiment 2 of the present invention.

In the following, the wide zoom of Embodiment 2 will be explained with reference to FIG. 2.

The lens of this embodiment has substantially the same 4-group 11-sheet lens configuration as that of the above-mentioned Embodiment 1 but mainly differs therefrom in that the fifth lens $L_5$ is a positive meniscus lens having a convex surface directed onto the enlargement side, each of the sixth lens $L_6$ and tenth lens $L_{10}$ is a biconvex lens having a surface with a stronger curvature directed onto the reduction side, the seventh lens $L_7$ is a negative meniscus lens having a convex surface directed onto the reduction side, the eighth lens $L_8$ is a biconcave lens having a surface with a stronger curvature directed onto the enlargement side, and the sixth lens $L_6$ and seventh lens $L_7$ are cemented together.

Here, all the above-mentioned conditional expressions (1) to (8) are satisfied, while their respective values are set as shown in Table 6.

Also, the F number and field angle 2 ω of the wide zoom lens in this embodiment are 2.53 (wide angle end) to 2.86 (medium) to 3.26 (telephoto end) and 53.2° (wide angle end) to 43.0° (medium) to 34.6° (telephoto end), respectively.

Table 2 (follows) shows radius of curvature R (mm) of each lens surface, center thickness of each lens and air gap between neighboring lenses D (mm), and refractive index N of each lens at d-line in this embodiment.

FIGS. 9, 10, and 11 are aberration charts showing various kinds of aberration (spherical aberration, astigmatism, distortion, and chromatic aberration in magnification) of the zoom lens of this embodiment at the wide angle end, medium range, and telephoto end, respectively As can be seen from FIGS. 9 to 11 and Table 6, in accordance with the wide zoom lens of this embodiment, aberration can be favorably corrected throughout the zoom area, a compact configuration for the imaging size can be attained, an appropriate extent of back focus can be obtained, and the bundle of rays within the tangential plane on the reduction side can be made substantially symmetrical with respect to the optical axis.

(Embodiment 3)

Figure 3:
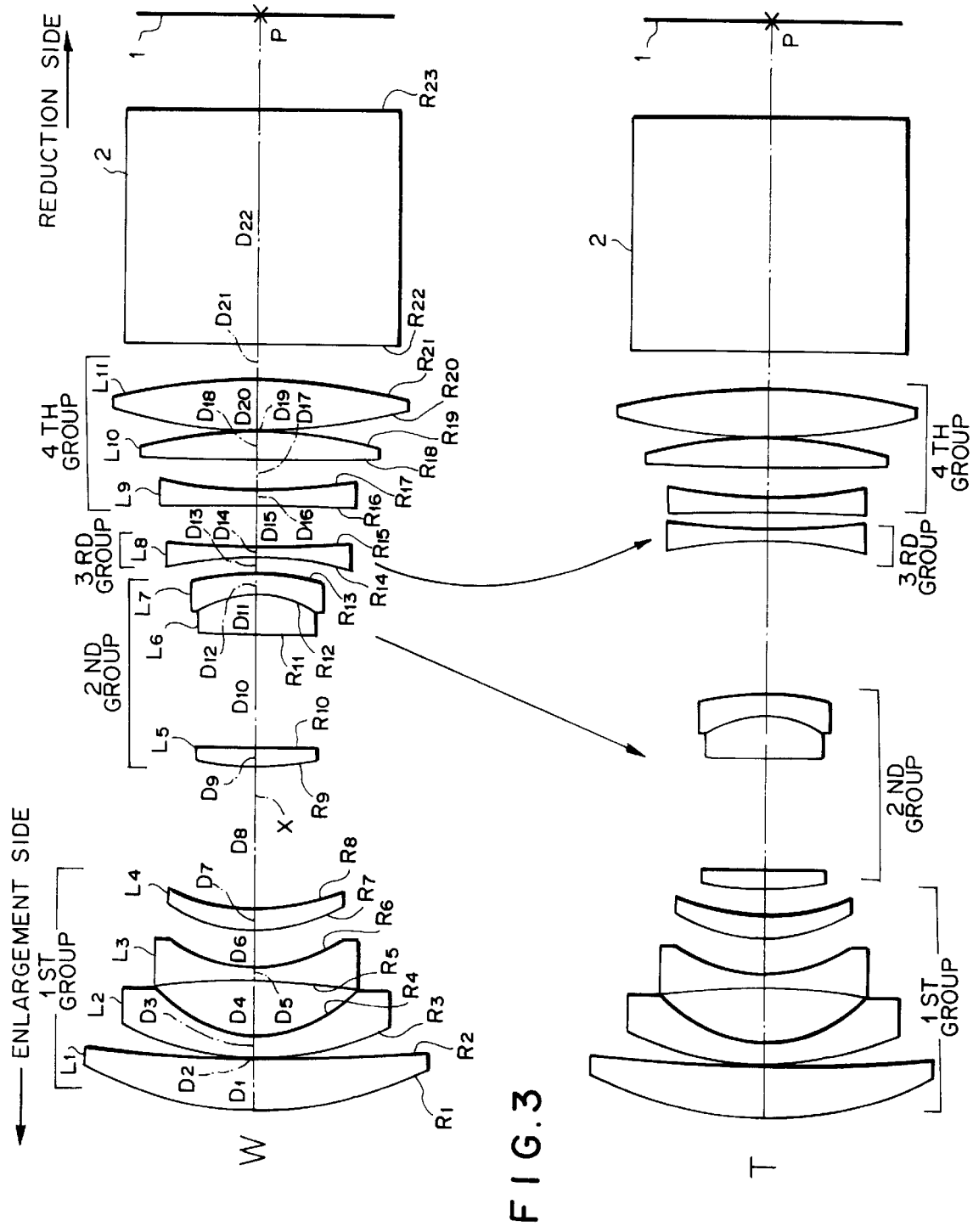
FIG. 3 is a schematic view showing a basic lens configuration in accordance with Embodiment 3 of the present invention.

In the following, the wide zoom of Embodiment 3 will be explained with reference to FIG. 3.

The lens of this embodiment has substantially the same lens configuration as that of the above-mentioned Embodiment 2 but mainly differs therefrom in that the fifth lens $L_5$ is a biconvex lens having a surface with a stronger curvature directed onto the enlargement side, and the ninth lens $L_9$ is a biconcave lens having a surface with a stronger curvature directed onto the reduction side.

Here, all the above-mentioned conditional expressions (1) to (8) are satisfied, while their respective values are set as shown in Table 6.

Also, the F number and field angle 2 ω of the wide zoom lens in this embodiment are 2.85 (wide angle end) to 3.24 (medium) to 3.73 (telephoto end) and 59.6° (wide angle end) to 48.6° (medium) to 39.4° (telephoto end), respectively.

Table 3 (follows) shows radius of curvature R (mm) of each lens surface, center thickness of each lens and air gap between neighboring lenses D (mm), and refractive index N of each lens at d-line in this embodiment.

Figures 13A, 13B, 13C, 13D:
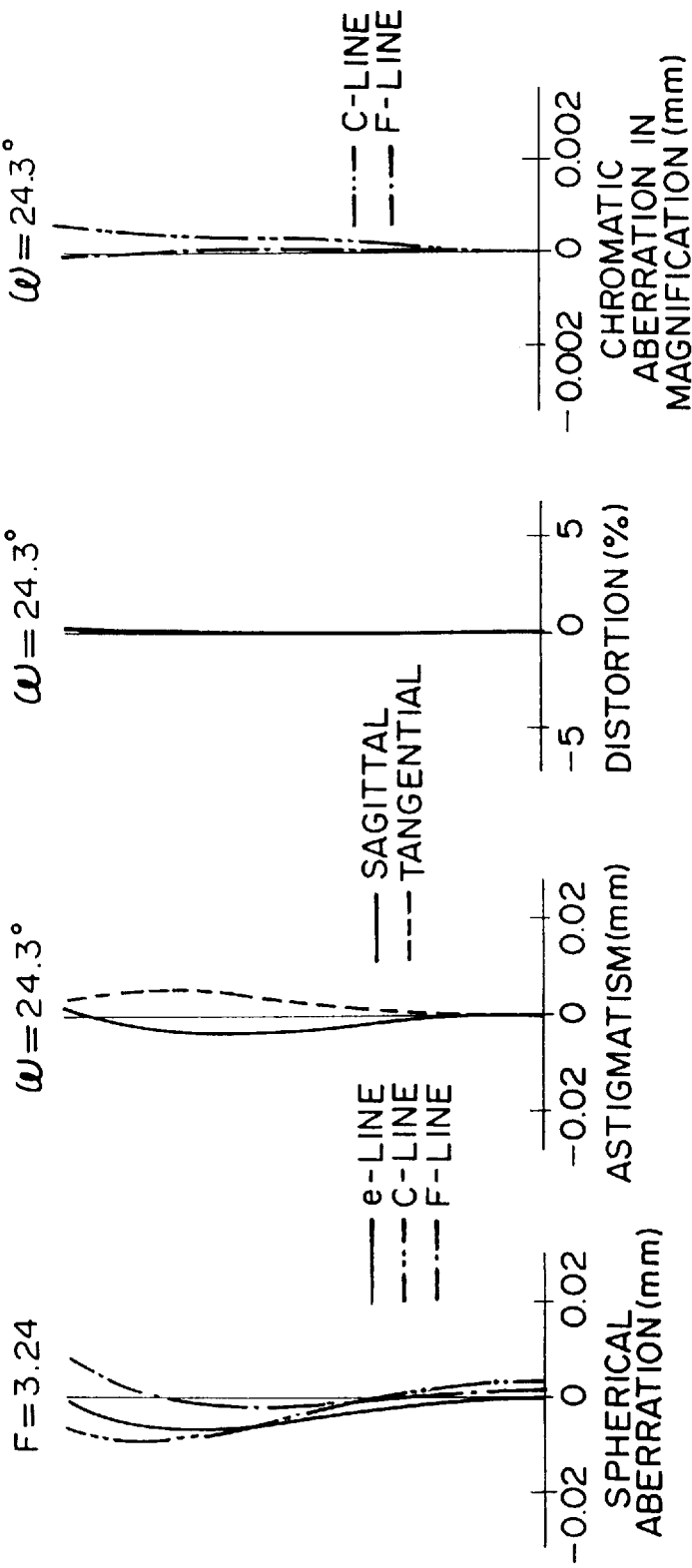
FIGS. 13A to 13D is an aberration chart of the lens in accordance with Embodiment 3 (at its medium range)

FIGS. 12, 13, and 14 are aberration charts showing various kinds of aberration (spherical aberration, astigmatism, distortion, and chromatic aberration in magnification) of the zoom lens of this embodiment at the wide angle end, medium range, and telephoto end, respectively.

As can be seen from FIGS. 12 to 14 and Table 6, in accordance with the wide zoom lens of this embodiment, aberration can be favorably corrected throughout the zoom area, a compact configuration for the imaging size can be attained, an appropriate extent of back focus can be obtained, and the bundle of rays within the tangential plane on the reduction side can be made substantially symmetrical with respect to the optical axis.

(Embodiment 4)

Figure 4:
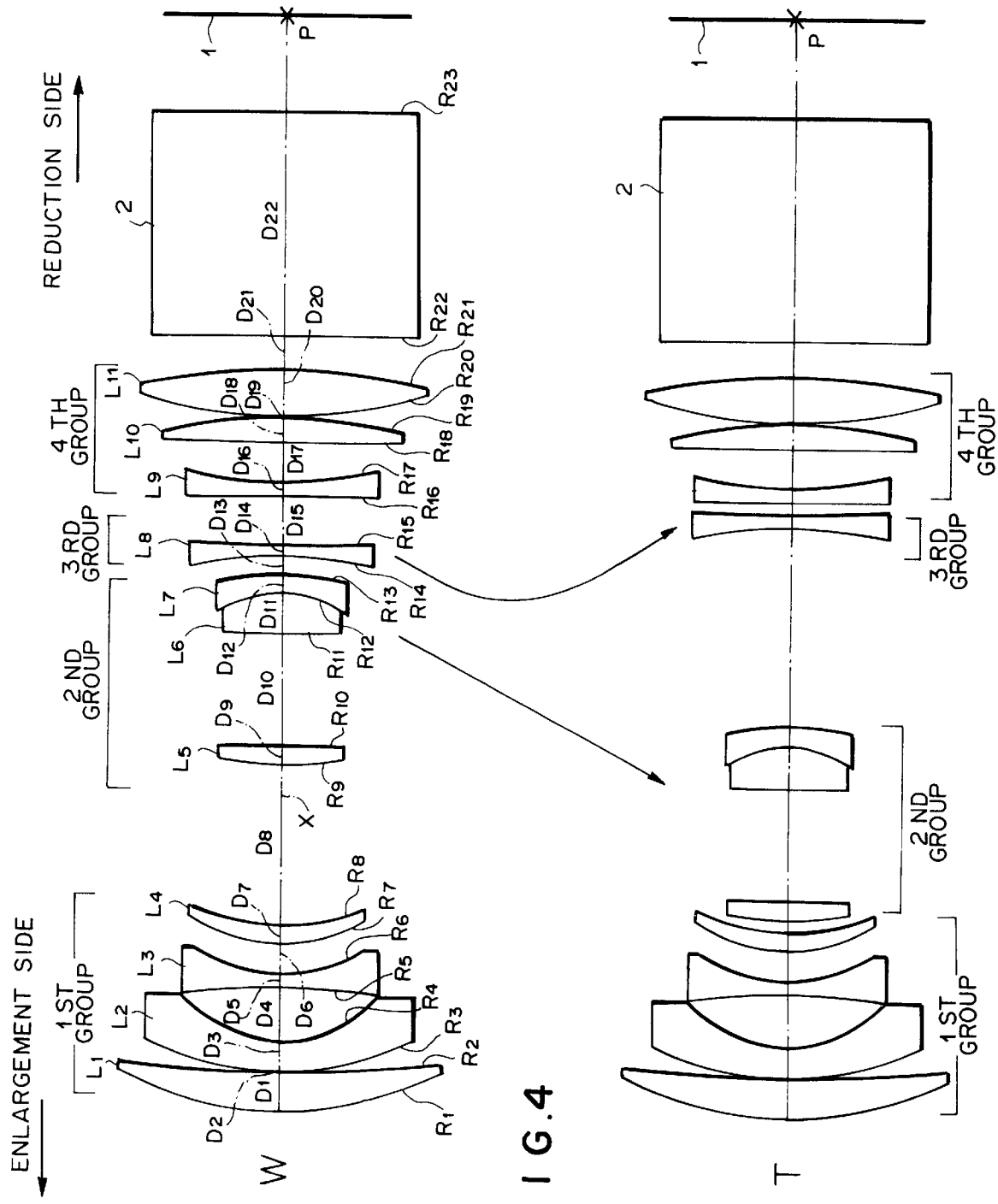
FIG. 4 is a schematic view showing a basic lens configuration in accordance with Embodiment 4 of the present invention.

In the following, the wide zoom of Embodiment 4 will be explained with reference to FIG. 4.

The lens of this embodiment has substantially the same configuration as that of the above-mentioned Embodiment 2.

Here, all the above-mentioned conditional expressions (1) to (8) are satisfied, while their respective values are set as shown in Table 6.

Also, the F number and field angle 2 ω of the wide zoom lens in this embodiment are 2.85 (wide angle end) to 3.35 (medium) to 3.98 (telephoto end) and 56.8° (wide angle end) to 43.4° (medium) to 33.4° (telephoto end), respectively.

Table 4 (follows) shows radius of curvature R (mm) of each lens surface, center thickness of each lens and air gap between neighboring lenses D (mm), and refractive index N of each lens at d-line in this embodiment.

Figures 16A, 16B, 16C, 16D:
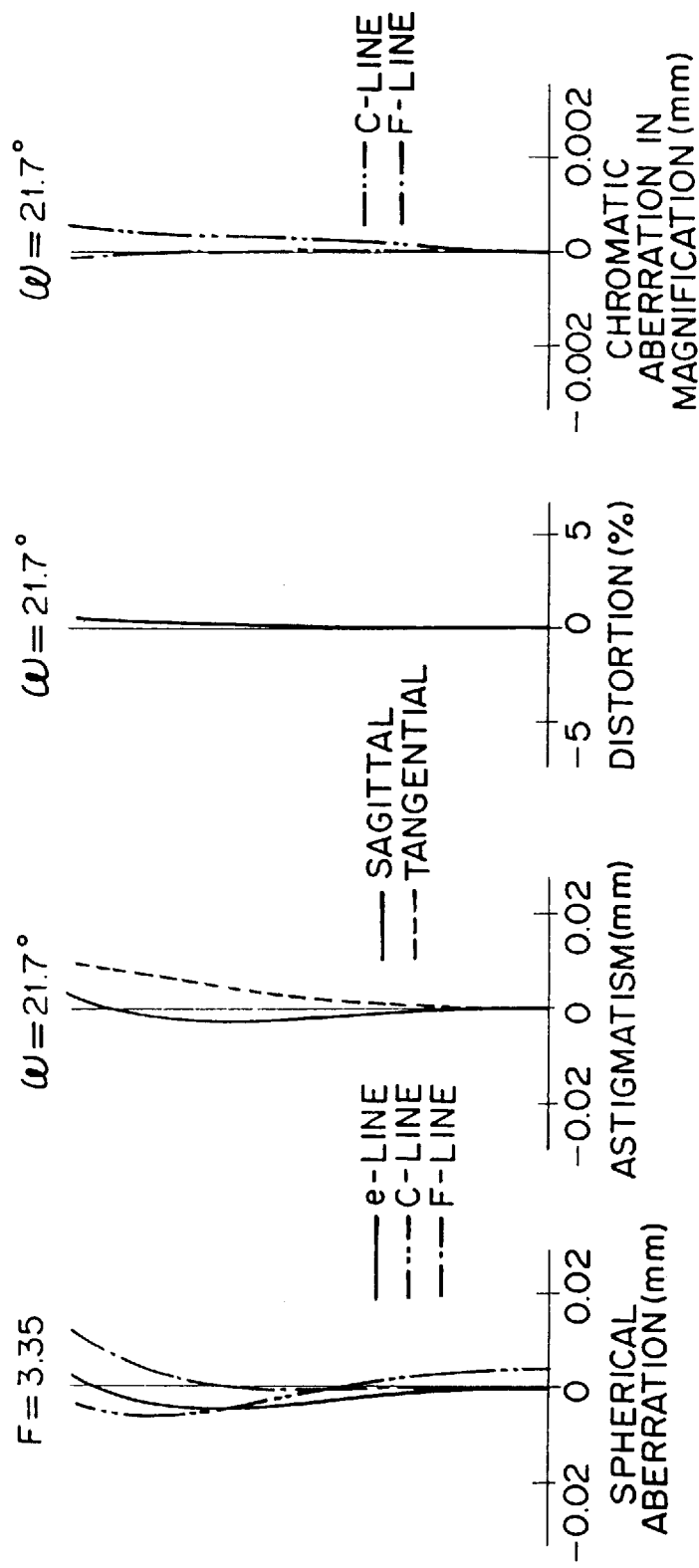
FIGS. 16A to 16D is an aberration chart of the lens in accordance with Embodiment 4 (at its medium range)
Figures 17A, 17B, 17C, 17D:
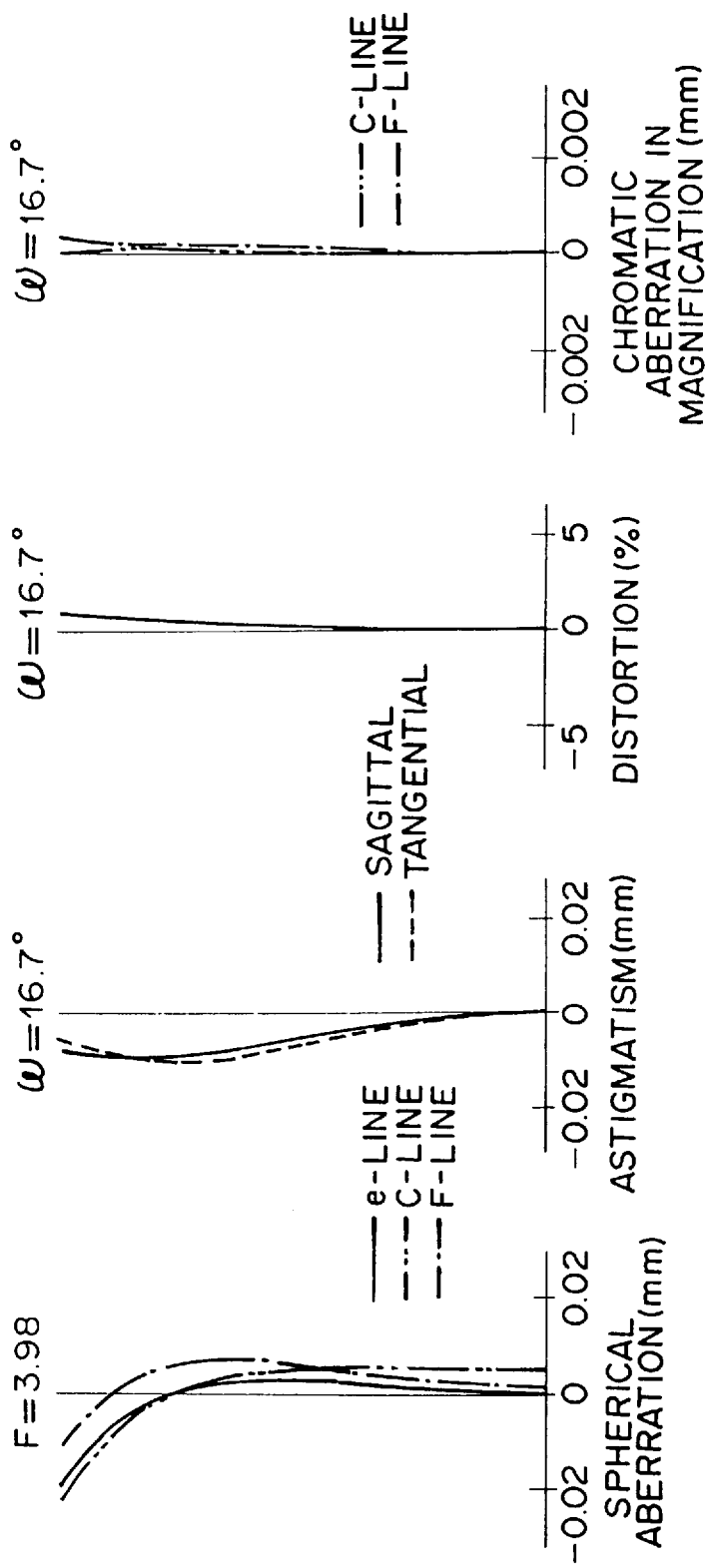
FIGS. 17A to 17D is an aberration chart of the lens in accordance with Embodiment 4 (at its telephoto end)

FIGS. 15, 16, and 17 are aberration charts showing various kinds of aberration (spherical aberration, astigmatism, distortion, and chromatic aberration in magnification) of the zoom lens of this embodiment at the wide angle end, medium range, and telephoto end, respectively.

As can be seen from FIGS. 15 to 17 and Table 6, in accordance with the wide zoom lens of this embodiment, aberration can be favorably corrected throughout the zoom area, a compact configuration for the imaging size can be attained, an appropriate extent of back focus can be obtained, and the bundle of rays within the tangential plane on the reduction side can be made substantially symmetrical with respect to the optical axis.

(Embodiment 5)

Figure 5:
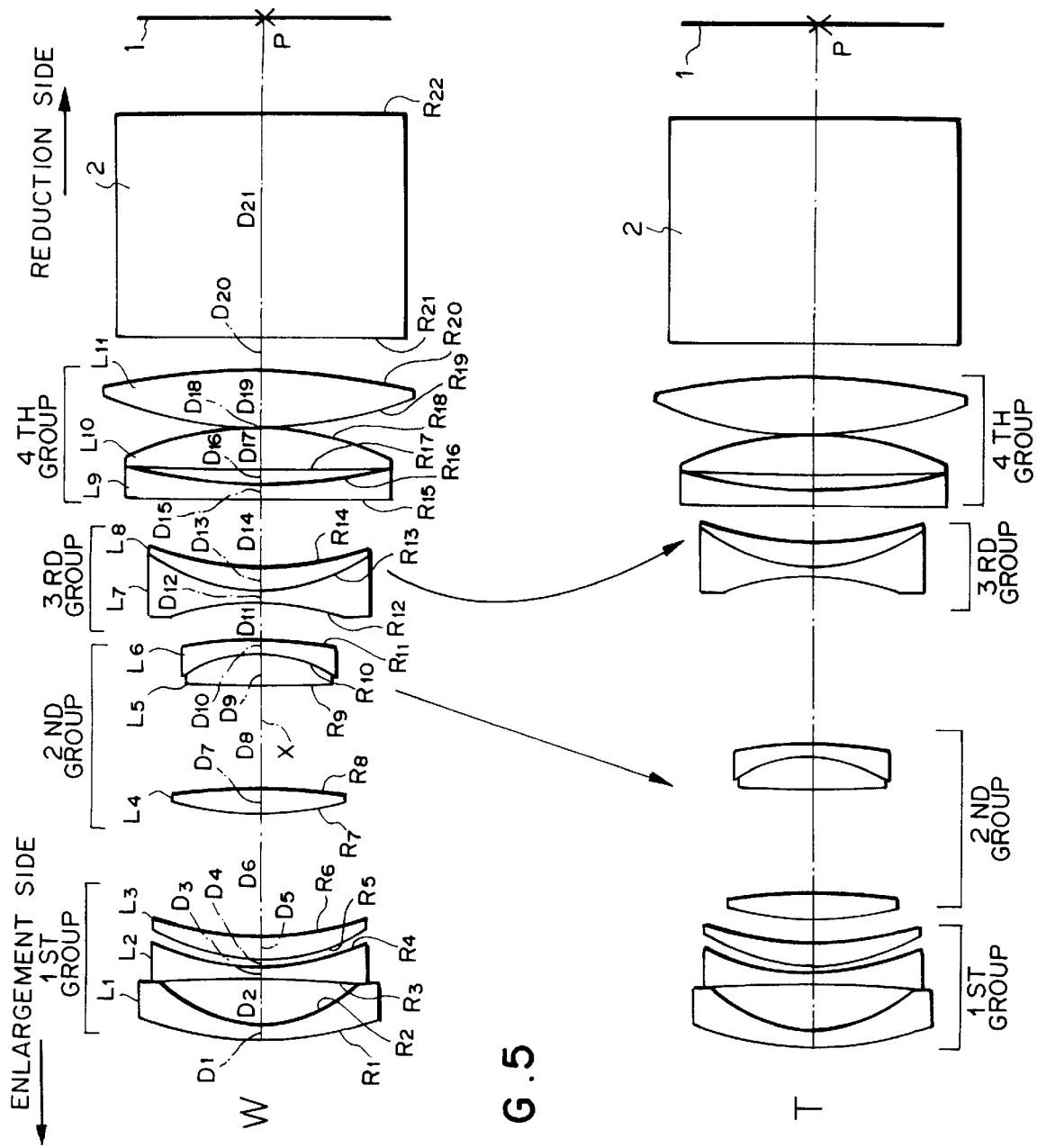
FIG. 5 is a schematic view showing a basic lens configuration in accordance with Embodiment 5 of the present invention.

In the following, the wide zoom of Embodiment 5 will be explained with reference to FIG. 5.

The lens of this embodiment has substantially the same 4-group 11-sheet lens configuration as that of the wide zoom lenses of the other embodiments but mainly differs therefrom in that the first lens group, second lens group, and third lens group are constituted by three sheets of lenses $L_1$ to $L_3$, three sheets of lenses $L_4$ to $L_6$, and two sheets of lenses $L_7$ and $L_8$, respectively.

Here, all the above-mentioned conditional expressions (1) to (8) are satisfied, while their respective values are set as shown in Table 6.

Also, the F number and field angle 2 ω of the wide zoom lens in this embodiment are 2.54 (wide angle end) to 2.92 (medium) to 3.40 (telephoto end) and 54.6° (wide angle end) to 43.2° (medium) to 34.6° (telephoto end), respectively.

Table 5 (follows) shows radius of curvature R (mm) of each lens surface, center thickness of each lens and air gap between neighboring lenses D (mm), and refractive index N of each lens at d-line in this embodiment.

Figures 19A, 19B, 19C, 19D:
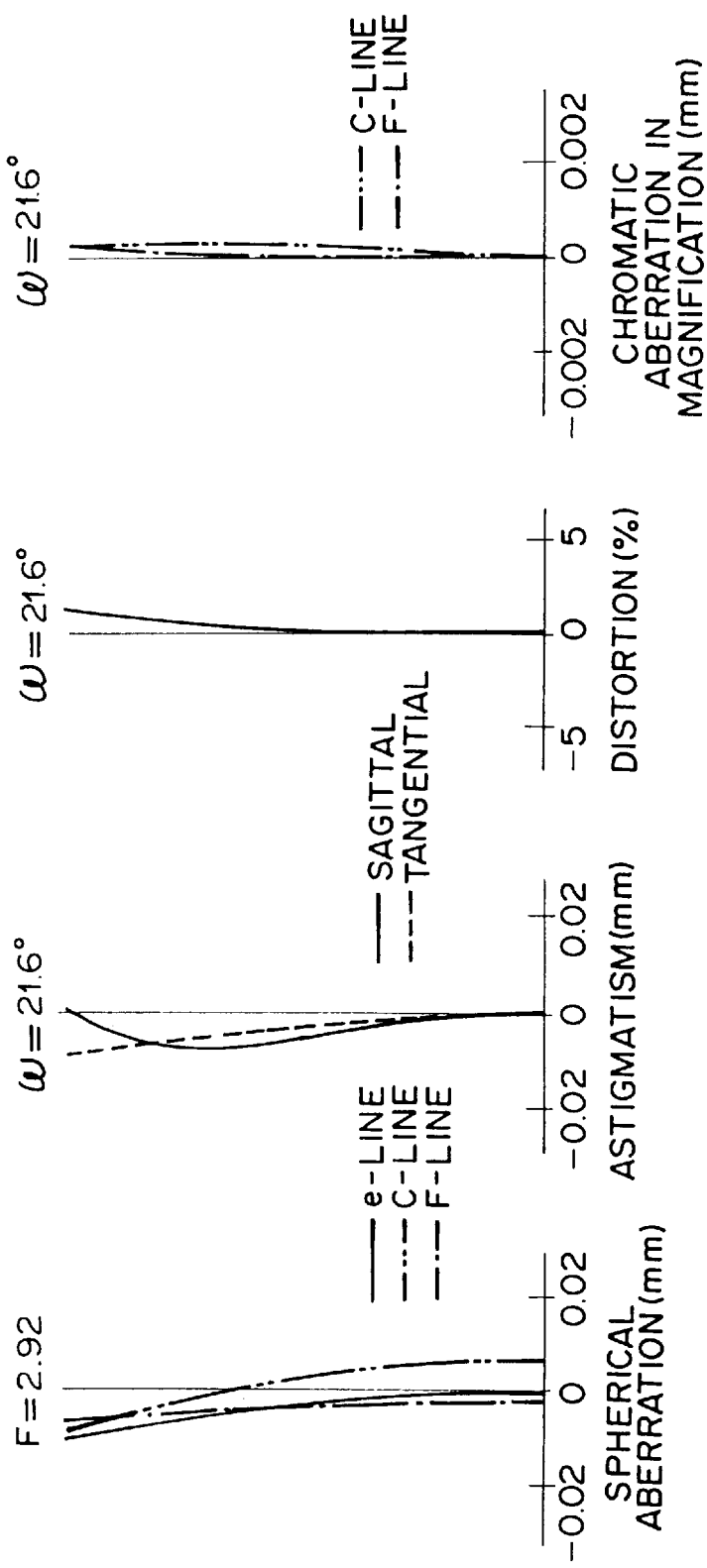
FIGS. 19A to 19D is an aberration chart of the lens in accordance with Embodiment 5 (at its medium range)

FIGS. 18, 19, and 20 are aberration charts showing various kinds of aberration (spherical aberration, astigmatism, distortion, and chromatic aberration in magnification) of the zoom lens of this embodiment at the wide angle end, medium range, and telephoto end, respectively.

As can be seen from FIGS. 18 to 20 and Table 6, in accordance with the wide zoom lens of this embodiment, aberration can be favorably corrected throughout the zoom area, a compact configuration for the imaging size can be attained, an appropriate extent of back focus can be obtained, and the bundle of rays within the tangential plane on the reduction side can be made substantially symmetrical with respect to the optical axis.

Without being restricted to the foregoing embodiments, the wide zoom lens of the present invention can be modified in various manners. For example, the curvature R of each lens and lens spacing (or lens thickness) D, as well as the refractive index N and Abbe number ν can be appropriately changed. Also, when necessary, a brightness stop can be disposed within the lens system.

As explained in the foregoing, in accordance with the wide zoom lens of the present invention, in a four-group type zoom lens in which the second and third lens groups are movable, since the focal lengths and so forth of the respective groups are set within their appropriate ranges as mentioned above, the lens system can have a compact configuration for its imaging size, the back focus can be set to an appropriate extent such that a color separating optical system or the like can be inserted at a predetermined position, and various kinds of aberration can be made favorable.

Further, a mode of so-called telecentric type in which the bundle of rays within the tangential plane on the reduction side are made substantially symmetrical with respect to the optical axis can be attained, whereby the color fluctuation and light quantity loss can be reduced when the zoom lens is used in a system such as projection type television using liquid crystals.

Also, when the distance between the adjacent positive lenses in the second lens group is made long, while the whole length of the second lens group is relatively large, the aberration balance at the time of zooming can be made favorable.

TABLE 1

| M | R | D | N | ν |
|---|---|---|---|---|
| 1 | 2.188 | 0.115 | 1.65844 | 50.9 |
| 2 | 41.539 | 0.006 | | |
| 3 | 1.080 | 0.125 | 1.48749 | 70.4 |
| 4 | 0.531 | 0.182 | | |
| 5 | −2.253 | 0.050 | 1.48749 | 70.4 |
| 6 | 0.548 | 0.079 | | |
| 7 | 0.600 | 0.116 | 1.84666 | 23.8 |
| 8 | 0.818 | 0.537 (Variable) | | |
| 9 | 1.306 | 0.076 | 1.84666 | 23.8 |
| 10 | 0.451 | 0.132 | 1.70200 | 40.2 |
| 11 | −1.655 | 0.509 | | |
| 12 | 6.247 | 0.075 | 1.72916 | 54.7 |
| 13 | −1.135 | 0.059 (Variable) | | |
| 14 | −2.577 | 0.047 | 1.58144 | 40.9 |
| 15 | 0.866 | 0.084 (Variable) | | |
| 16 | 2.467 | 0.059 | 1.80518 | 25.5 |
| 17 | 1.486 | 0.301 | | |
| 18 | 3.214 | 0.107 | 1.72916 | 54.7 |
| 19 | −4.627 | 0.006 | | |
| 20 | 2.096 | 0.174 | 1.62041 | 60.4 |
| 21 | −2.531 | 0.138 | | |
| 22 | ∞ | 0.912 | 1.51633 | 64.1 |
| 23 | ∞ | | | |

TABLE 2

| M | R | D | N | ν |
|---|---|---|---|---|
| 1 | 1.488 | 0.188 | 1.65844 | 50.9 |
| 2 | 12.189 | 0.039 | | |
| 3 | 1.513 | 0.109 | 1.62041 | 60.4 |
| 4 | 0.596 | 0.190 | | |
| 5 | −3.311 | 0.050 | 1.51454 | 54.7 |
| 6 | 0.581 | 0.101 | | |
| 7 | 0.661 | 0.151 | 1.84666 | 23.8 |
| 8 | 0.957 | 0.497 (Variable) | | |
| 9 | 1.317 | 0.121 | 1.84666 | 23.8 |
| 10 | 4.036 | 0.214 | | |
| 11 | 4.825 | 0.199 | 1.74100 | 52.6 |
| 12 | −0.447 | 0.078 | 1.84666 | 23.8 |

TABLE 2-continued

| M | R | D | N | ν |
|---|---|---|---|---|
| 13 | −1.275 | 0.080 (Variable) | | |
| 14 | −2.313 | 0.047 | 1.48749 | 70.4 |
| 15 | 4.028 | 0.332 (Variable) | | |
| 16 | 8.383 | 0.059 | 1.80518 | 25.5 |
| 17 | 1.306 | 0.194 | | |
| 18 | 9.368 | 0.112 | 1.71300 | 53.9 |
| 19 | −2.214 | 0.004 | | |
| 20 | 1.801 | 0.206 | 1.72342 | 38.0 |
| 21 | −2.544 | 0.137 | | |
| 22 | ∞ | 0.899 | 1.51633 | 64.1 |
| 23 | ∞ | | | |

TABLE 3

| M | R | D | N | ν |
|---|---|---|---|---|
| 1 | 1.597 | 0.229 | 1.69700 | 48.5 |
| 2 | 7.125 | 0.010 | | |
| 3 | 1.347 | 0.090 | 1.62041 | 60.4 |
| 4 | 0.595 | 0.249 | | |
| 5 | −2.995 | 0.057 | 1.48749 | 70.4 |
| 6 | 0.660 | 0.164 | | |
| 7 | 0.701 | 0.096 | 1.84666 | 23.8 |
| 8 | 0.919 | 0.583 (Variable) | | |
| 9 | 1.345 | 0.083 | 1.83400 | 37.3 |
| 10 | −105.733 | 0.489 | | |
| 11 | 20.646 | 0.181 | 1.69680 | 55.5 |
| 12 | −0.446 | 0.090 | 1.84666 | 23.8 |
| 13 | −1.240 | 0.070 (Variable) | | |
| 14 | −1.774 | 0.054 | 1.68893 | 31.1 |
| 15 | 5.045 | 0.179 (Variable) | | |
| 16 | −22.239 | 0.067 | 1.80518 | 25.5 |
| 17 | 2.056 | 0.141 | | |
| 18 | 32.734 | 0.136 | 1.72916 | 54.7 |
| 19 | −1.764 | 0.004 | | |
| 20 | 2.316 | 0.219 | 1.78470 | 26.2 |
| 21 | −2.476 | 0.157 | | |
| 22 | ∞ | 1.032 | 1.51633 | 64.1 |
| 23 | ∞ | | | |

TABLE 4

| M | R | D | N | ν |
|---|---|---|---|---|
| 1 | 1.496 | 0.172 | 1.69700 | 48.5 |
| 2 | 6.176 | 0.004 | | |
| 3 | 1.284 | 0.132 | 1.62041 | 60.4 |
| 4 | 0.568 | 0.235 | | |
| 5 | −2.977 | 0.054 | 1.48749 | 70.4 |
| 6 | 0.648 | 0.144 | | |
| 7 | 0.682 | 0.075 | 1.84666 | 23.8 |
| 8 | 0.899 | 0.662 (Variable) | | |
| 9 | 1.456 | 0.079 | 1.83400 | 37.3 |
| 10 | −22.228 | 0.487 | | |
| 11 | 257.377 | 0.179 | 1.69680 | 55.5 |
| 12 | −0.454 | 0.084 | 1.84666 | 23.8 |
| 13 | −1.151 | 0.071 (Variable) | | |
| 14 | −1.891 | 0.051 | 1.68893 | 31.1 |
| 15 | 9.092 | 0.222 (Variable) | | |
| 16 | −63.796 | 0.063 | 1.80518 | 25.5 |
| 17 | 1.826 | 0.173 | | |
| 18 | 26.692 | 0.121 | 1.72916 | 54.7 |
| 19 | −1.993 | 0.004 | | |
| 20 | 2.096 | 0.199 | 1.78470 | 26.2 |
| 21 | −2.973 | 0.147 | | |
| 22 | ∞ | 0.971 | 1.51633 | 64.1 |
| 23 | ∞ | | | |

TABLE 5

| M | R | D | N | υ |
|---|---|---|---|---|
| 1 | 1.428 | 0.056 | 1.65844 | 50.9 |
| 2 | 0.564 | 0.190 | | |
| 3 | -5.176 | 0.048 | 1.48749 | 70.4 |
| 4 | 1.031 | 0.030 | | |
| 5 | 0.808 | 0.090 | 1.80518 | 25.5 |
| 6 | 1.432 | 0.471 (Variable) | | |
| 7 | 1.282 | 0.104 | 1.69680 | 55.5 |
| 8 | -2.478 | 0.412 | | |
| 9 | 4.844 | 0.137 | 1.63854 | 55.4 |
| 10 | -0.500 | 0.052 | 1.76182 | 26.6 |
| 11 | -1.758 | 0.148 (Variable) | | |
| 12 | -1.020 | 0.044 | 1.51742 | 52.4 |
| 13 | 0.724 | 0.093 | 1.71736 | 29.5 |
| 14 | 1.233 | 0.284 (Variable) | | |
| 15 | ∞ | 0.060 | 1.80518 | 25.5 |
| 16 | 2.094 | 0.054 | | |
| 17 | 14.234 | 0.171 | 1.62041 | 60.4 |
| 18 | -1.140 | 0.004 | | |
| 19 | 1.632 | 0.229 | 1.65844 | 50.9 |
| 20 | -2.729 | 0.140 | | |
| 21 | ∞ | 0.919 | 1.51633 | 64.1 |
| 22 | ∞ | | | |

TABLE 6

| Expression | Embodiment 1 | Embodiment 2 | Embodiment 3 | Embodiment 4 | Embodiment 5 |
|---|---|---|---|---|---|
| (1) | -1.34 | -1.48 | -1.49 | -1.51 | -1.21 |
| (2) | 0.87 | 1.11 | 1.19 | 1.18 | 1.01 |
| (3) | 1.33 | 1.45 | 1.33 | 1.47 | 1.12 |
| (4) | 0.91 | 0.55 | 0.71 | 0.70 | 0.70 |
| (5, 9) | -0.58 | -0.97 | -0.88 | -0.82 | -0.92 |
| (6, 10) | 0.24 | 0.27 | 0.10 | 0.23 | -0.04 |
| (7, 11) | 50.9 | 50.9 | 48.5 | 48.5 | 50.9 |
| (8) | 0.59 | 0.18 | 0.41 | 0.41 | 0.41 |

What is claimed is:

1. A wide angle zoom lens comprising, successively from an enlargement side, a first lens group which is fixed and has a negative refractive power for focusing; a second lens group having a positive refractive power and a third lens group having a negative refractive power which are moved with a relationship therebetween so as to vary power and correct movement of imaging surface caused by thus varied power; and a fourth lens group which is fixed and has a positive refractive power;

wherein the following conditional expressions (1), (2), and (3) are satisfied:

$$-2.0 < F_1/F < -0.9 \quad (1)$$

$$0.65 < F_2/F < 1.4 \quad (2)$$

$$0.9 < F_4/F < 1.7 \quad (3)$$

wherein

F is focal length of the whole lens system at a wide angle end;

$F_1$ is focal length of the first lens group;

$F_2$ is focal length of the second lens group; and $F_4$ is focal length of the fourth lens group.

2. A wide angle zoom lens according to claim 1, wherein said second lens group is constituted by at least one negative lens and two positive lenses and satisfies the following conditional expression (4):

$$0.4 < D_2/F_2 < 1.1 \quad (4)$$

wherein $D_2$ is lens length of the second lens group.

3. A wide angle zoom lens according to claim 2, wherein imaging magnification at the wide angle end of said second lens group and imaging magnification of said fourth lens group are configured so as to satisfy the following conditional expressions (5) and (6):

$$-1.05 < \beta 2W < -0.45 \quad (5)$$

$$-0.15 < \beta 4 < 0.35 \quad (6)$$

wherein

β 2W is the imaging magnification at the wide angle end of the second lens group; and β 4 is the imaging magnification of the fourth lens group.

4. A wide angle zoom lens according to claim 3, wherein Abbe number of the lens positioned closest to the enlargement side end in said first lens group is constituted so as to satisfy the following conditional expression (7):

$$\nu 1 < 55 \quad (7)$$

wherein ν 1 is the Abbe number of the lens positioned closest to the enlargement side end in the first lens group.

5. A wide angle zoom lens according to claim 1, wherein said second lens group is constituted by at least one negative lens and two positive lenses and satisfies the following conditional expression (8):

$$0.08 < DD_2/F_2 < 0.75 \quad (8)$$

wherein $DD_2$ is the longest distance between the positive lenses in the second lens group.

6. A wide angle zoom lens according to claim 5, wherein imaging magnification at the wide angle end of said second lens group and imaging magnification of said fourth lens group are configured so as to satisfy the following conditional expressions (9) and (10):

$$-1.05 < \beta 2W < -0.45 \quad (9)$$

$$-0.15 < \beta 4 < 0.35 \quad (10)$$

wherein

β 2W is the imaging magnification at the wide angle end of the second lens group; and β 4 is the imaging magnification of the fourth lens group.

7. A wide angle zoom lens according to claim 6, wherein Abbe number of the lens positioned closest to the enlargement side end in said first lens group is constituted so as to satisfy the following conditional expression (11):

$$\nu 1 < 55 \quad (11)$$

wherein ν 1 is the Abbe number of the lens positioned closest to the enlargement side end in the first lens group.

* * * * *